June 15, 1943.  E. J. KUEBERT  2,322,031
ADJUSTABLE CAM
Filed Jan. 28, 1942  3 Sheets-Sheet 1
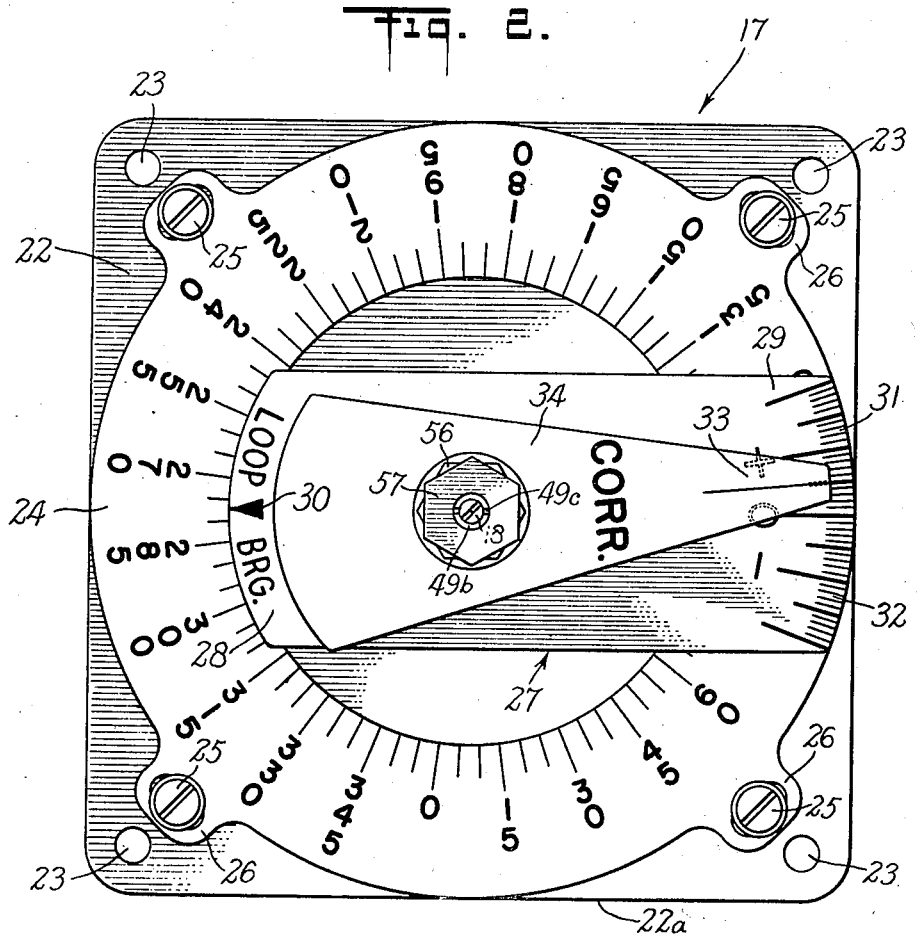
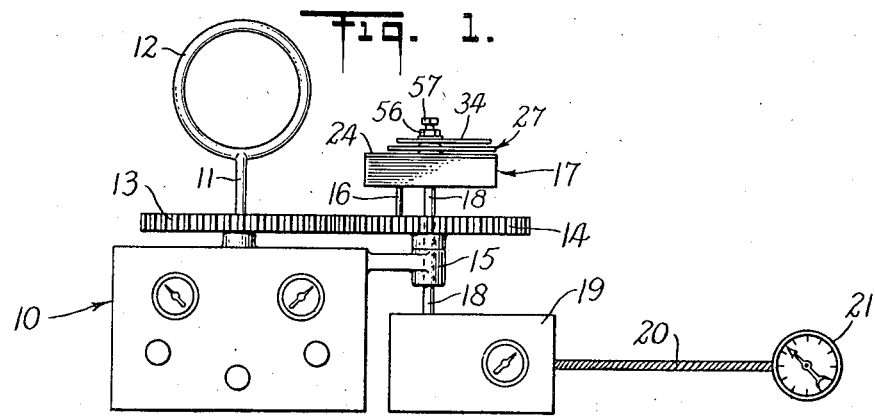
INVENTOR
Edward J. Kuebert
BY
ATTORNEYS June 15, 1943.  E. J. KUEBERT  2,322,031
ADJUSTABLE CAM
Filed Jan. 28, 1942  3 Sheets-Sheet 2
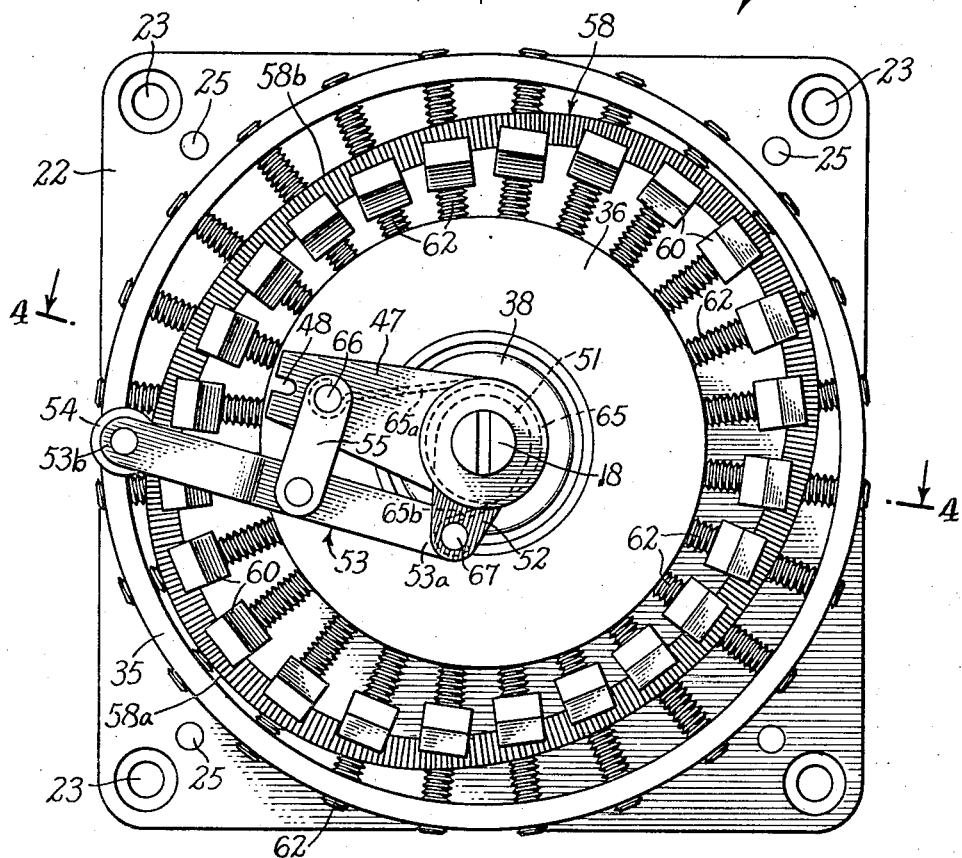
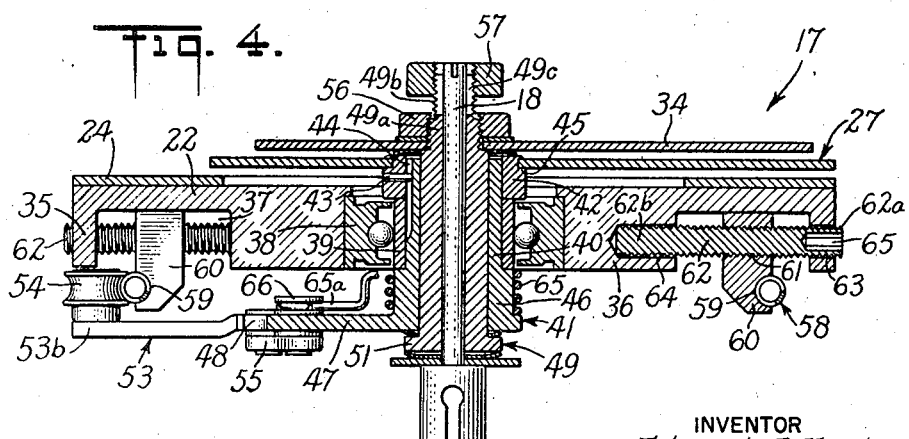
INVENTOR
Edward J. Kuebert
BY
Blair, Curtis & Hayward
ATTORNEYS June 15, 1943.  E. J. KUEBERT  2,322,031
ADJUSTABLE CAM
Filed Jan. 28, 1942  3 Sheets-Sheet 3

INVENTOR
Edward J. Kuebert
BY
Blair, Curtis & Hayward
ATTORNEYS

Patented June 15, 1943

2,322,031

UNITED STATES PATENT OFFICE 2,322,031

ADJUSTABLE CAM

Edward J. Kuebert, Bellmore, N. Y., assignor to Fairchild Aviation Corporation, Jamaica, N. Y., a corporation of Delaware Application January 28, 1942, Serial No. 428,449

3 Claims. (Cl. 74—568)

This invention relates to a compensating device for augmenting or decreasing an input value by any predetermined variable or fixed amount, and transmitting the corrected value to an output. More particularly and illustratively, the invention is directed to a compensating device which automatically compensates for the deflection of a radio wave from its true bearing, and delivers an output, the value of which is proportional to the value of the true bearing of the wave.

Radio compasses have come into common use as part of the navigating equipment on aircraft. Such compasses are for the most part equipped with revoluble loop antennae to intercept a radio wave or signal regardless of the location of its transmitter. The difficulty, however, lies in the fact that the angle between the wave and the line of flight of the airplane is often such that the wave is intercepted and deflected by various parts of the airplane, such as the engines, wings, etc., so that when the wave is picked up by the radio compass the true bearing of the wave is not indicated on the radio compass card. For example, if the airplane is flying due north, and the true bearing of the wave is 45° west of north, the wave might be intercepted and deflected by one of the airplane engines to such an extent as to indicate an apparent bearing of 30° west of north.

Inasmuch as the wave deflecting characteristics of an airplane can be readily determined and plotted as a definite value, it but remains to add or subtract such value as the case may be to the apparent value of the bearing of the wave to obtain a corrected value identical with that of the true bearing of the wave. In other words, using the example given above, the position of the radio compass loop would indicate an apparent value of 30°, but it having been predetermined that the deviation for that setting of the loop is plus 15°, the value of the true bearing is the sum of the apparent value and the airplane characteristic deviation value, or 45°.

Accordingly, it is among the objects of this invention to provide a simple, compact, inexpensive and sturdy compensating device which is capable of increasing or decreasing an apparent value by an amount equal to the difference between the apparent value and the true value.

The invention accordingly consists in the features of construction, combinations of elements, and arrangements of parts as will be exemplified in the structure to be hereinafter described, and the scope of the application of which will be indicated in the following claims.

In the drawings, wherein there is shown one of the various possible embodiments of my invention, Figure 1 is a schematic view of my compensator connected to a radio compass and to an indicating mechanism;

Figure 2 is an enlarged top plan view of the compensating device;

Figure 3 is an enlarged bottom plan view of the compensating device;

Figure 4 is a sectional elevation taken along the line 4—4 of Figure 3; and,

Similar reference characters refer to similar parts throughout the several views of the drawings.

Figure 5:
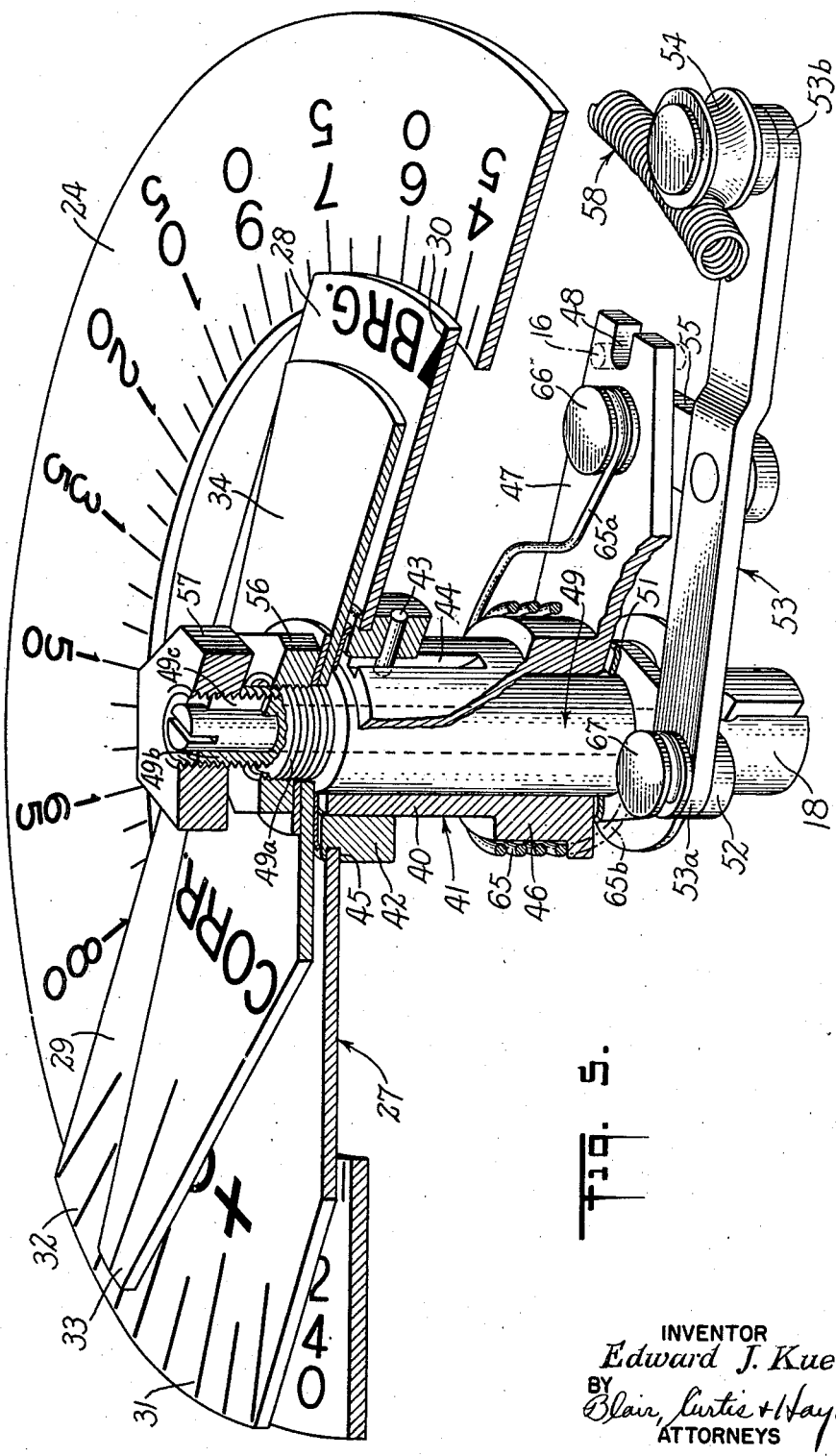
Figure 5 is an enlarged fragmentary perspective view of the compensating device, portions thereof being broken away for illustrative clarity.

Referring first to Figure 1, a radio compass, generally indicated at 10, includes a rotatable shaft 11 which supports a loop antenna 12. Shaft 11 also supports a gear 13 which rotates with loop 12 and meshes with a gear 14 rotatably mounted on a bracket 15 secured to and extending from compass 10. Gear 14 carries a radially spaced driving pin 16 which transmits an input value to my compensator generally indicated at 17. Compensator 17 has an output shaft 18 which extends through gear 14 and bracket 15, being freely rotatable with respect thereto, and provides a drive for the self-synchronous motor of the transmitter 19 of a telemetering device. Transmitter 19 is connected by an electrical cable 20 to the receiver or indicator 21 of the telemetering device, which indicates the value of the output of compensator 17. Compensator 17 (Figure 2) includes a base or mounting plate 22 suitably drilled in the corners, as at 23, to provide holes through which securing studs may extend. Secured to the top of base 22 is a ring 24 graduated in degrees on both sides, and accordingly comprising a reversible loop bearing scale adapted for clockwise or counterclockwise rotation for indicating the uncorrected angular position of the radio compass loop antenna 12 (Figure 1). Ring 24 is bolted to base 22 by bolts 25 which extend through ears 26 extending from the ring. Preferably ears 26 are slotted so as to facilitate assembly of the ring to the base.

A loop bearing pointer generally indicated at 27 is revolubly mounted on base 22 above scale 24 in a manner to be described, and includes a short arm 28 and a long arm 29 lying on opposite sides of its pivotal axis. The short arm 28 of this pointer includes a reference mark 30 which registers on the graduations of scale 24 to indicate the setting of compass loop 12, movement of the loop being directly reflected by movement of pointer 27, as will be described below. Hence reference mark 30 on pointer 27 indicates the angular setting of loop 12 (Figure 1) and accordingly indicates the value of the apparent bearing of the radio wave intercepted by the loop antenna.

The long arm 29 of loop pointer 27 is graduated in degrees on opposite sides of a zero reference point, thus providing a positive correction scale 31 and a negative correction scale 32. Over the correction scales 31 and 32 moves the end 33 of a correction pointer 34 mounted on base 22 and revoluble about the pivotal axis of loop pointer 27. Movement of correction pointer 34 over correction scales 31 and 32 indicates on the correction scales for any given setting of loop reference indicator 30 a value which represents the difference between the value of the apparent bearing of the radio wave and the value of the true bearing thereof. Hence from loop scale 24 and correction scales 31 and 32 the true bearing of the radio wave can be readily calculated by adding or subtracting, as the case may be, the indicated deviation on the correction scales to or from the value of the apparent bearing as indicated by loop reference 30.

The deviation of loop antenna 12 which is reflected by the movement of loop pointer 27, will hereinafter be considered and termed the input to compensator 17, and what will hereinafter be termed and considered as the output of the compensator will be the deviation of loop bearing pointer 27 as modified by correction pointer 34, all as effected by mechanisms now to be described.

Base 22 (Figure 4) includes an outer annular downwardly projecting shoulder 35 and an inner annular downwardly projecting shoulder 36 which together form a circular channel 37 within which is disposed mechanism to be described hereinbelow. Annular shoulder 36 forms in base 22 a centrally disposed opening within which is pressed a ball bearing 38 which journals a bushing 39 pressed about the reduced shank 40 of a sleeve generally indicated at 41. On the upper end of sleeve shank 40 is disposed a collar 42 through which a pin 43 extends into a keyway 44 formed in sleeve shank 40 so that rotation of the sleeve is imparted to the collar. The upper end of collar 42 has a shoulder 45 formed thereon on which loop bearing pointer 27 is secured as by swaging over the end of the collar. Thus any rotational movement imparted to sleeve 41 rotates the pointer 27 about the axis of the sleeve.

Extending radially from the enlarged lower portion 46 of sleeve 41 is a tapering arm 47 (see also Figure 3) having a notch 48 formed therein. It is into this notch 48 that pin 16 (Figure 1) extends, and accordingly it will appear that the rotation imparted to gear 14 through movement of loop 12 is transmitted by pin 16 to arm 47 (Figure 4) and accordingly through sleeve 41 and collar 42 to loop bearing pointer 27. Thus pointer 27 indicates the deviation of the radio compass loop antenna, i. e., the input referred to above.

As shown in Figures 4 and 5, sleeve 41 is mounted on a hollow shaft generally indicated at 49, through which extends output shaft 18 (Figure 4). Sleeve 41 is movable relative to shafts 49 and 18, and shaft 18 is movable relative to shaft 49 for purposes of adjustment of indicator 21, as will be pointed out hereinbelow. The lower end of hollow shaft 49 (Figure 4) has secured thereto a hub 51 from which extends a radial arm 52 (Figure 5). An arm generally indicated at 53 has one end 53a thereof pivotally connected to the outer end of arm 52, while its free end 53b rotatably mounts a roller 54. Arms 47 and 53 are connected together by a link 55, the opposite ends of which are respectively pivotally connected to the two arms so that movement of arm 47 by pin 16, as described above, results in movement of arm 53 and accordingly arm 52 and hollow shaft 49. In other words, the input to arm 47 is transmitted by way of link 55, arm 53 and arm 52 to hollow shaft 49.

The upper end of shaft 49 has a reduced portion 49a threaded to receive a nut 56 which, when taken up, clamps correction pointer 34 tightly in place on the shaft so that the pointer moves therewith. The upper end 49b of shaft 49 is further reduced and threaded and has its sides split as shown at 49c (Figure 5). When a tapered nut 57 is threaded on end 49b of the shaft, this end is squeezed against the upper end of shaft 18 to connect shafts 49 and 18 together. Accordingly, rotation of shaft 49 is imparted to output shaft 18.

It may now be seen that the input to compensator 17 is transmitted to an output as follows: Loop 12 (Figure 1), gears 13 and 14, input pin 16 (Figure 5), arm 47, link 55, arm 53, arm 52, hollow shaft 49 and output shaft 18. It will also appear that as long as arms 53 and 47 bear a fixed relationship to one another, the output value of shaft 18 is identical to the input value to the compensator, i. e., sleeve 41 (Figure 4) and shaft 18 rotate together through the same number of degrees.

As pointed out hereinbefore, however, it becomes necessary under certain circumstances to augment or decrease the input value by predetermined variable or fixed amounts so that the output value will be a compensated value and accordingly an accurate indication of the condition being interpreted. To this end, roller 54 (Figures 3 and 4) rides along an adjustable cam generally indicated at 58, the contour of which may be varied in accordance with predetermined characteristics of the structure on which the radio compass is mounted, in the present instance an airplane.

Cam 58 is formed by a tightly coiled circular spring which is retained in grooves 59 (Figure 4) formed in shoes 60 (Figure 3) adjustably disposed within annular channel 37, in a manner to be described.

Each of shoes 60 has a threaded hole 61 extending therethrough which threadably receives a screw 62, the outer end 62a of which is loosely received in a hole 63 drilled in shoulder 35, and the inner end 62b of which is loosely disposed in a hole 64 formed in inner shoulder 36. The outer end 62a of screw 62 has a hexagonal hole 65 formed therein for the reception of a key or the like (not shown) by which the screw can be turned. Hence, as screw 62 is turned one way, shoe 60 is moved radially outwardly, for example, whereas if the screw is turned the other way, shoe 60 is moved inwardly toward the axis of shaft 18, for example. Thus, as is more clearly shown in Figure 3, each of shoes 60 is readily adustable and accordingly, with their grooves 59, form a channel of variable periperal contour within which cam 58 is disposed. Screws 62 and also shoes 60 are held in their adjusted positions by the tension of cam spring 58, and it is preferred that the tension of the spring be of sufficient value to hold the shoes against inadvertent displacement from their adjusted positions. It will now appear that cam 58 may be contoured substantially as desired within the limits of annular channel 37, through the radial adjustment of shoes 60.

As shown in Figure 5, a spring 65 is coiled about lower portion 46 of sleeve 41 and has one end 65a connected to a stud 66 extending from arm 47, the other end 65b of spring 65 being connected to the pivot pin 67, which pivotally connects arms 52 and 53. Thus, spring 65 (Figure 3) imparts a clockwise bias to arm 47 and a counterclockwise bias to arm 52, which latter bias forces arm 53 to the right, as viewed in Figure 3, and accordingly always pulls roller 54 against cam surface 58.

As pointed out above input movement of arm 47 is transmitted through link 55 and arm 53 to arm 52. However, as these arms rotate about the axis of output shaft 18, roller 54 rides over cam surface 58, and as the contour of the cam is usually non-circular, the radial distance between roller 54 and output shaft 18 varies. For example, when roller 54 rides over a high spot on cam 58 as, for example, portion 58a thereof, the radial distance between the roller and shaft 18 increases, with the result that arm 52 is moved outwardly, and accordingly hollow shaft 49 is moved clockwise. This clockwise movement of shaft 49 is imparted to correction pointer 34 (Figure 4) which accordingly moves counterclockwise, as viewed in Figure 2. This counterclockwise movement of hollow shaft 49 (Figure 4) is also relative to sleeve 41, it being noted that movement of the sleeve causes movement of loop bearing pointer 27, with the result that correction pointer 34 (Figure 2) moves relative to loop bearing pointer 27. This relative movement between pointers 34 and 27 is indicated on one or the other of scales 31, 32, and accordingly a plus or minus correction of the loop bearing deflection as indicated by reference 30 is given. Furthermore, the compensating movement of hollow shaft 49 (Figure 4) is also imparted to output shaft 18 through the lock nut mechanism described, so that the output of this shaft is augmented or decreased by a predetermined amount for a given setting.

Similarly, when roller 54 (Figure 3) rides over a low spot on cam 58, such as portion 58b thereof, roller 54 moves toward shaft 18, resulting in counterclockwise movement of arm 52 and shaft 49, and accordingly clockwise movement of correction pointer 34, as viewed in Figure 2, relative to loop bearing pointer 27.

As noted above, shoes 60 are individually adjustable toward and away from the axis of shaft 18 which is preferably vertical when compensator 17 is installed on the airplane. Also edge 22a (Figure 2) of compensator base 22, for present purposes, will be considered as the leading edge of the compensator and lying at right angles to the longitudinal axis of the airplane or its line of flight. When the compensator is so installed on the airplane it can be calibrated with respect to a radio wave of known bearing as follows: The airplane can be so positioned on the ground that its longitudinal axis is in perfect alignment with the path of transmission of the radio wave being transmitted from a station in front of the airplane. Under such circumstances the angle between the wave bearing and the longitudinal axis of the airplane is zero degrees. Thus, loop bearing pointer 27 (Figure 2) would indicate 0° when the plane of the loop antenna 12 (Figure 1) is at right angles to the longitudinal axis of the airplane. If the correction pointer 34 indicates plus or minus for this position, the shoe or shoes 60 (Figure 3) adjacent roller 54 are adjusted to move the adjacent portion of cam 58 and accordingly the roller until the correction pointer indicates zero. After shoe or shoes 60 have been so adjusted, output shaft 18 is adjusted to obtain a zero reading on the receiver indicator 21 (Figure 1). To this end lock nut 57 (Figure 4) is loosened to relax the grip of the split end 49b of hollow shaft 49 on the upper end of output shaft 18 to permit turning the output shaft relative to the hollow shaft. The output shaft is then turned in one direction or the other until indicator 21 (Figure 1) registers the same as loop bearing pointer 27 (Figure 2), in this instance, zero. Thus, the indicated bearing of indicator 21 and that of the radio path are consistent.

Next the airplane is pivoted clockwise, for example 15°, the desired angular displacement between adjacent shoes 60 (Figure 3) although any other suitable spacing can be used. In this position it is known that the angle between the radio path and the longitudinal axis of the airplane is 15°. The loop antenna is then adjusted until it is on the path of the wave and such adjustment is reflected by movement of loop bearing pointer 27 (Figure 2) to or towards the 15° mark on scale 24. If no portion of the airplane is intercepting the radio wave at this position, and accordingly is not deflecting it, loop 12 (Figure 1) will have moved 15° and this bearing will be indicated by pointer 27 on scale 24. Assuming no radio wave deflection, the position of correction pointer 34 can be set to zero by proper adjustment of the shoe or shoes 60 (Figure 3) adjacent roller 54 for this setting. By this adjustment of the correction pointer output shaft 18 is moved, this movement being transmitted to indicator 21 to correct its reading.

Assuming, however, that pivoting the airplane 15° from the 0° position brings into position some portion of the airplane structure which intercepts and accordingly deflects the radio wave, then angular adjustment of loop 12 (Figure 1) until it is on the path will be through an angle which is greater or less than 15° by an amount proportional to the radio wave deflection. Under such circumstances the loop bearing pointer 27 (Figure 2) will indicate an apparent bearing greater or less than 15° and it becomes necessary to set in the proper correction. This is accomplished by first determining the difference between the apparent and true bearing (assume the apparent bearing is 20°, 5° more than the true bearing). The shoe or shoes 60 (Figure 3) adjacent roller 54 are then adjusted so as to move correction pointer 34 to the 5° mark on its minus scale 32 so that the difference between the apparent bearing on scale 24 and the correction on scale 32 is 15°. This adjustment of the correction pointer is transmitted to output shaft 18, as described above, so that the total deflection of the output shaft is 15°, i. e., the true bearing of the radio path which is also recorded on indicator 21.

It will accordingly appear that the airplane can be pivoted 360° in 15° increments, and for each increment the proper correction set into compensator 12 through the adjustment of cam 58. Hence, regardless of the line of flight of the airplane when aloft, the true bearing of a radio wave can be immediately determined regardless of the deflection of its path by the airplane structure.

After compensator 17 has been adjusted, as described above, it operates as follows: The airplane navigator revolves loop 12 until it is on the desired radio wave path. This movement of the loop is imparted through gears 13 and 14 (Figure 1) and through pin 16 (Figure 5) to arm 47, causing the arm to rotate in one direction or another. This movement of arm 47 rotates sleeve 41 causing movement of direction pointer 27 to a position wherein its reference mark 30 (Figure 2) indicates on scale 24 an apparent bearing of the radio path. However, as arm 47 (Figure 5) is moved, its movement is also imparted to arm 53 by reason of connecting link 55, and accordingly cam follower 54 is moved over cam 58 to the set position. Assuming that this position coincides with a high spot on cam 58, arm 53, and accordingly arm 52, are pivoted clockwise, as viewed in Figure 5, to move hollow shaft 49 relative to sleeve 41. This movement of shaft 49 results in movement of correction pointer 34 relative to loop bearing pointer 27 so that the correction pointer registers on the minus scale 32 (Figure 2) the difference between the apparent loop bearing, as indicated by reference mark 30, and the true bearing of the radio wave. This corrective movement of hollow shaft 49 (Figure 5) is also imparted to output shaft 18, which transmits the movement to telemeter motor 19 which, in turn, affects indicator 21 so that its pointer indicates the true bearing of the radio wave.

It might be noted that indicator 21 may conveniently be located in the cockpit of the airplane in a position readily visible to the pilot or navigator under circumstances which would preclude and a readily visible disposition of compensator 17 and the scales thereon.

It will now appear that I have provided a compensating device which practicably and efficiently carries out the several objects hereinabove set forth.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. An adjustable cam device comprising, in combination, a base having an annular recess formed therein, said recess being formed by inner and outer ring-like projections, a plurality of screws extending through regularly spaced holes in said outer ring-like projection and into regularly spaced holes in said inner ring-like projection, said screws being freely rotatable in said holes and being arranged in spoke-like formation with respect to the axis of said annular recess, a substantial portion of each of said screws lying in said recess, a nut-like member threaded on each of said screws and adjustable axially thereof upon rotation of its screw, and a coiled spring encircling and engaging said members and variable as to contour in accordance with the adjusted positions of said members, said spring being under tension when in engagement with said members so as to bind said screws against free rotation in their holes.

2. An adjustable cam device comprising, in combination, a base having an annular recess formed therein, said recess being formed by inner and outer ring-like projection, a plurality of screws extending through regularly spaced holes in said outer ring-like projection and into regularly spaced holes in said inner ring-like projection, said screws being freely rotatable in said holes and being arranged in spoke-like formation with respect to the axis of said annular recess, a substantial portion of each of said screws lying in said recess, a nut-like member threaded on each of said screws and adjustable axially thereof upon rotation of its screw, each of said members including a portion extending out of said recess, each of said portions having a groove formed therein, and a closely coiled endless spring encircling and engaging all of said members and being disposed within said grooves and variable as to contour in accordance with the adjusted positions of said members, said spring being under tension when in engagement with said members so as to bind said screws against free rotation in their holes.

3. An adjustable cam device comprising, in combination, a base, means forming an annular recess in said base, a plurality of screws revolubly mounted in said base and arranged in spoke-like formation with respect to the axis of said annular recess, a substantial portion of each of said screws lying in said recess, a nut-like member threaded on each of said screws and adjustable axially thereof, and a coiled spring encircling and engaging all of said members and variable as to contour in accordance with the adjusted positions of said members.

EDWARD J. KUEBERT.